(12) United States Patent
Yang

(10) Patent No.: US 12,554,768 B2
(45) Date of Patent: Feb. 17, 2026

(54) DATA RETRIEVAL PREDICTION METHOD, ELECTRONIC DEVICE, AND READABLE MEDIUM

(71) Applicant: ZHEJIANG UNIVIEW TECHNOLOGIES CO., LTD., Zhejiang (CN)

(72) Inventor: Chunyan Yang, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 1 day.

(21) Appl. No.: 18/563,636

(22) PCT Filed: Dec. 8, 2021

(86) PCT No.: PCT/CN2021/136264
§ 371 (c)(1),
(2) Date: Nov. 22, 2023

(87) PCT Pub. No.: WO2022/257392
PCT Pub. Date: Dec. 15, 2022

(65) Prior Publication Data
US 2024/0273132 A1      Aug. 15, 2024

(30) Foreign Application Priority Data
Jun. 9, 2021   (CN) .......................... 202110642775.9

(51) Int. Cl.
*G06F 16/51* (2019.01)
*G06F 16/583* (2019.01)

(52) U.S. Cl.
CPC ............ *G06F 16/51* (2019.01); *G06F 16/583* (2019.01)

(58) Field of Classification Search
CPC .... G06F 16/51; G06F 16/583; G06F 16/2477; G06F 16/7867; G06F 16/71; G06F 16/532; G06Q 10/04
See application file for complete search history.

(56) References Cited

U.S. PATENT DOCUMENTS

| | | | |
|---|---|---|---|
| 2008/0071844 A1 | 3/2008 | Gopal et al. | |
| 2010/0189115 A1* | 7/2010 | Kitada | H04L 45/00 370/400 |

(Continued)

FOREIGN PATENT DOCUMENTS

| | | |
|---|---|---|
| CN | 101547216 A | 9/2009 |
| CN | 108108486 A | 6/2018 |

(Continued)

OTHER PUBLICATIONS

International Search Report in Application No. PCT/CN2021/136264, dated Mar. 9, 2022, 4 pages, including translation.

(Continued)

*Primary Examiner* — Aleksandr Kerzhner
*Assistant Examiner* — Aryan D Toughiry
(74) *Attorney, Agent, or Firm* — MASCHOFF BRENNAN

(57) ABSTRACT

A method includes that the data storage path information used by a data object in a target query time period is determined, that a target operation object through which the data object written from a source end to a destination end passes is determined from the data storage path information, and that a storage situation of the data object in the target query time period is predicted and determined by performing a storage-affecting event analysis on the target operation object.

10 Claims, 2 Drawing Sheets

(56) References Cited

U.S. PATENT DOCUMENTS

| | | | | |
|---|---|---|---|---|
| 2020/0125568 A1* | 4/2020 | Idicula | .................. | G06N 20/20 |
| 2020/0242095 A1* | 7/2020 | Malik | .................. | G06F 16/245 |
| 2020/0342007 A1* | 10/2020 | Bracholdt | ............. | G06F 16/288 |
| 2020/0371858 A1* | 11/2020 | Hayakawa | .......... | G06F 11/0793 |

FOREIGN PATENT DOCUMENTS

| | | |
|---|---|---|
| CN | 111858240 A | 10/2020 |
| CN | 112650807 A | 4/2021 |
| CN | 112799896 A | 5/2021 |

OTHER PUBLICATIONS

Extended European Search in Application No. 21944888.3, dated Mar. 31, 2025, 10 pages.
First Search Report in Chinese Application No. 2021106427759, dated May 21, 2025, 4 pages, including translation.
First Office Action in Chinese Application No. 202110642775.9, dated May 24, 2025, 18 pages, including translation.

* cited by examiner

DATA RETRIEVAL PREDICTION METHOD, ELECTRONIC DEVICE, AND READABLE MEDIUM

CROSS-REFERENCE TO RELATED APPLICATION(S)

This is a national stage application filed under 35 U.S.C. 371 based on International Patent Application NO. PCT/CN2021/136264, filed Dec. 8, 2021, which claims priority to Chinese Patent Application No. 202110642775.9 filed with the China National Intellectual Property Administration (CNIPA) on Jun. 9, 2021, the disclosures of which is incorporated herein by reference in its entirety.

TECHNICAL FIELD

Embodiments of the present disclosure relate to the field of computer technology, for example, a data retrieval prediction method and apparatus, an electronic device, and a readable medium.

BACKGROUND

The attention to security systems and data is growing. The security systems are developing in an ultra-large direction, frequently equipped with tens of thousands of cameras. In some cases, for example, the process of image retrieval usually requires large-scale concurrent queries of stored images and intelligent historical data analysis, and the systems carry the huge service pressure of image retrieval.

The system regularly polls and retrieves all images within camera-defined time periods and stores results in a database, a memory, and a disk. When a stored image is searched for, the memory is queried first. Then the database is queried. Finally, the disk is queried. Although hierarchies are implemented through the memory, the database, and the disk, the pressure bottleneck of the database is obvious in the case of high service concurrency. Moreover, the size of the memory is limited. Accordingly, the system pressure caused by a large amount of concurrent retrieval cannot be resolved.

SUMMARY

The present disclosure provides a data retrieval prediction method and apparatus, an electronic device, and a readable medium.

In a first aspect, the present disclosure provides a data retrieval prediction method. The method includes the steps below.

Data storage path information used by a data object in a target query time period is determined.

A target operation object through which the data object written from a source end to a destination end passes is determined from the data storage path information.

A storage situation of the data object in the target query time period is predicted and determined by performing a storage-affecting event analysis on the target operation object.

In a second aspect, the present disclosure further provides a data retrieval prediction apparatus. The apparatus includes a storage path determination module, an operation object determination module, and a data storage prediction module.

The storage path determination module is configured to determine data storage path information used by a data object in a target query time period.

The operation object determination module is configured to determine, from the data storage path information, a target operation object through which the data object written from a source end to a destination end passes.

The data storage prediction module is configured to predict and determine a storage situation of the data object in the target query time period by performing a storage-affecting event analysis on the target operation object.

In a third aspect, the present disclosure further provides an electronic device. The electronic device includes at least one processor and a storage apparatus configured to store at least one program.

When executed by the at least one processor, the at least one program causes the at least one processor to perform the data retrieval prediction method in the present disclosure.

In a fourth aspect, the present disclosure further provides a computer-readable medium for storing a computer program. When executed by a processor, the computer program causes the processor to perform the data retrieval prediction method in the present disclosure.

DETAILED DESCRIPTION

Figure 1:
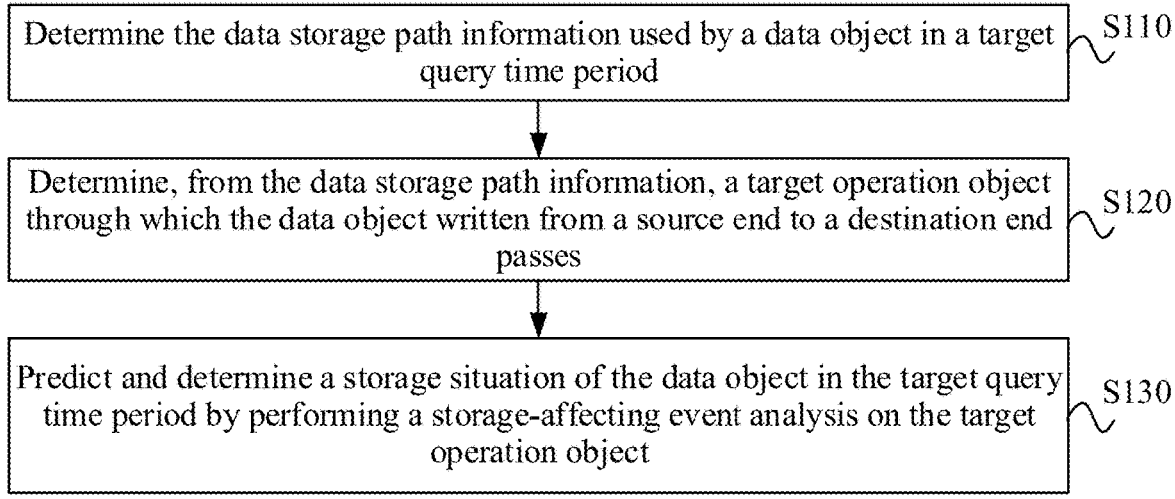
FIG. 1 is a flowchart of a data retrieval prediction method according to some embodiments of the present disclosure.

Hereinafter the present disclosure will be described in detail in conjunction with the drawings and embodiments.

Before exemplary embodiments are discussed in more detail, it is to be noted that some of the exemplary embodiments are described as processing or methods depicted in flowcharts. Although various operations (or steps) are described as sequential processing in the flowcharts, many of the operations (or steps) may be implemented in parallel, concurrently or simultaneously. Additionally, the sequence of the operations may be rearranged. The processing may be terminated when operations are completed, but the processing may further have additional steps that are not included in the drawings. The processing may correspond to a method, a function, a procedure, a subroutine, a subprogram, or the like.

A data retrieval prediction method and apparatus, an electronic device, and a readable medium provided in solutions of the present disclosure are described in detail hereinafter through various embodiments and solutions of the embodiments.

FIG. 1 is a flowchart of a data retrieval prediction method according to some embodiments of the present disclosure. Technical solutions in this embodiment may be applied to the case of querying a data storage situation in a storage device due to data requirements. The method may be performed by a data retrieval prediction apparatus. The apparatus may be implemented by software and/or hardware and integrated on any electronic device having a network communication function. As shown in FIG. 1, the data retrieval prediction method in this embodiment of the present disclosure may include the steps below.

In S110, the data storage path information used by a data object in a target query time period is determined.

In S120, a target operation object through which the data object written from a source end to a destination end passes is determined from the data storage path information.

In a security system, by way of example, the data object is a shot image. A front-end collection device may collect the data of the shot image and transmit and write the collected image data to a storage end device through a network to implement the storage operation of the shot image. For example, the video data collected by a front-end Internet Protocol camera (IPC) is transmitted and written to the storage end device through the network. In an embodiment, during data storage, the front-end collection device is taken as a start point, and the storage end device is taken as a destination point. A data stream of the data object may pass through network and device nodes, units, and modules and go through various operations in the security system so that the data storage is implemented. For example, an image stream of the shot image passes through the front-end collection device, a switch device, and a storage end device in sequence from the source end to the destination end.

Object predefinition is performed for all nodes, units, modules and operations in the security system. For example, a server device, a switch device, a storage end device, a storage end device grouping, a disk, an array, a user start-stop storage operation, an alarm linkage start-stop storage operation, and the like involved in the security system are defined as operation objects, as shown in Table 1. Moreover, for multiple predefined operation objects, a unique object number may be set for each operation object, and each operation object is described. Accordingly, the multiple operation objects are distinguished from each other.

TABLE 1

Operation object predefinition

| Object number | Object description |
| --- | --- |
| 001 | IPC |
| 002 | Switch |
| 003 | Router |
| 004 | Server |
| 005 | Storage device |
| 006 | Array |
| 007 | Disk |
| 008 | User start-stop storage operation |
| 009 | Alarm linkage start-stop storage operation |
| ... | ... |

During the data storage, the data stream of the data object passes through at least one operation object from the source end to the destination end in the security system to carry out storage so as to form a corresponding data storage path. For example, Table 2 shows an example of one data storage path in the data storage path information. For the data storage path information, a corresponding path code may be set for each preset data storage path. Each data storage path may include at least two operation objects.

TABLE 2

Data storage path information

| Path code | Object 1 | Object 2 | Object 3 | Object 4 | Object 5 | Object 6 |
| --- | --- | --- | --- | --- | --- | --- |
| 1000001 | IPC__001 | Optical transmitter and receiver__010 | Switch__066 | Switch__180 | Server__088 | Storage device grouping__099 |

In an embodiment, the data storage path information used by the data object at different time may be the same or may be different. That is, when written from the source end to the destination end in different time periods, the data object may experience fixed operation objects. Of course, when the data object is written from the source end to the destination end in different time periods, some operation objects through which the data object passes may be different.

An operation object through which the data object written from the source end to the destination end passes is selected from multiple operation objects indicated by the data storage path information and is marked as the target operation object here. Considering that multiple operation objects are involved in the data storage path information used by the data object in the target query time period, different operation objects in different query time periods may have different effects on the data storage. For example, some operation objects may have relatively great effects on the data storage while some operation objects usually do not have great effects on the data storage. In an embodiment, an operation object through which the data object written from the source end to the destination end in the target query time period passes and that satisfies a preset affecting condition is selected from the multiple operation objects indicated by the data storage path information and taken as the target operation object, preventing the storage-affecting event analysis on an invalid operation object from wasting analysis resources, thereby making a data retrieval prediction more accurate.

As a solution, operation objects through which the data object written from the source end to the destination end in the target query time period passes may include at least two of a front-end collection device, a server, a switch device, a storage end device, a storage end device grouping, a disk, an array, a user start-stop storage operation, or an alarm linkage start-stop storage operation.

In S130, a storage situation of the data object in the target query time period is predicted and determined by performing a storage-affecting event analysis on the target operation object.

The target operation object is a necessary item for the data storage among the multiple operation objects through which the data stream of the data object written from the source end to the destination end in the target query time period passes. If the target operation object undergoes a storage-affecting event in the data storage process, the storage process of the data object is usually affected, causing an abnormity in the data storage when the data object is written from the source end to the destination end. Therefore, the case of the target operation object affecting the data storage is captured, and it is analyzed whether the target operation object through which the data object written from the source end to the destination end passes undergoes a storage-affecting event in the target query time period. Accordingly, the storage situation of the data object in the target query time period is predicted.

As a solution, various affecting factors through which the multiple operation objects affect the data storage in the data storage process may be predefined, for example, including but not limited to a network outage, a power outage, a device restart, a service restart, and a user operation, as shown in Table 3. On this basis, the storage-affecting event analysis may be performed on an operation object to determine whether the operation object undergoes a storage-affecting event corresponding to a predefined affecting factor in the query time period. For the target operation object, a storage-affecting event undergone by the target operation object may include at least one of a network outage, a power outage, a device offline restart, a service offline restart, or a user operation

TABLE 3

Predefinition of affecting factors of operation objects

| Preset affecting factor number | Preset affecting factor description |
|---|---|
| 10001 | Power outage |
| 10002 | Network outage |
| 10003 | Crash |
| 10004 | ... |
| 10005 | Disk offline |
| 10006 | ... |
| 10007 | ... |
| 10008 | XX service down |
| 10009 | User operation 1 |
| ... | ... |

According to the data retrieval prediction method provided in this embodiment of the present disclosure, the data storage path information used by the data object in the target query time period is determined in a data retrieval scenario. The target operation object through which the data object written from the source end to the destination end in the target query time period passes and that is indicated by the data storage path information is determined. The storage situation of the data object in the target query time period is predicted by analyzing whether the target operation object is interfered with by a storage-affecting event. Instead of retrieving the stored data object directly, the data storage situation is predicted by using an operation object through which the data object written from the source end to the destination end passes to perform the storage-affecting event analysis, dispersing and resolving the system service pressure caused by a large amount of concurrent data retrieval.

Figure 2:
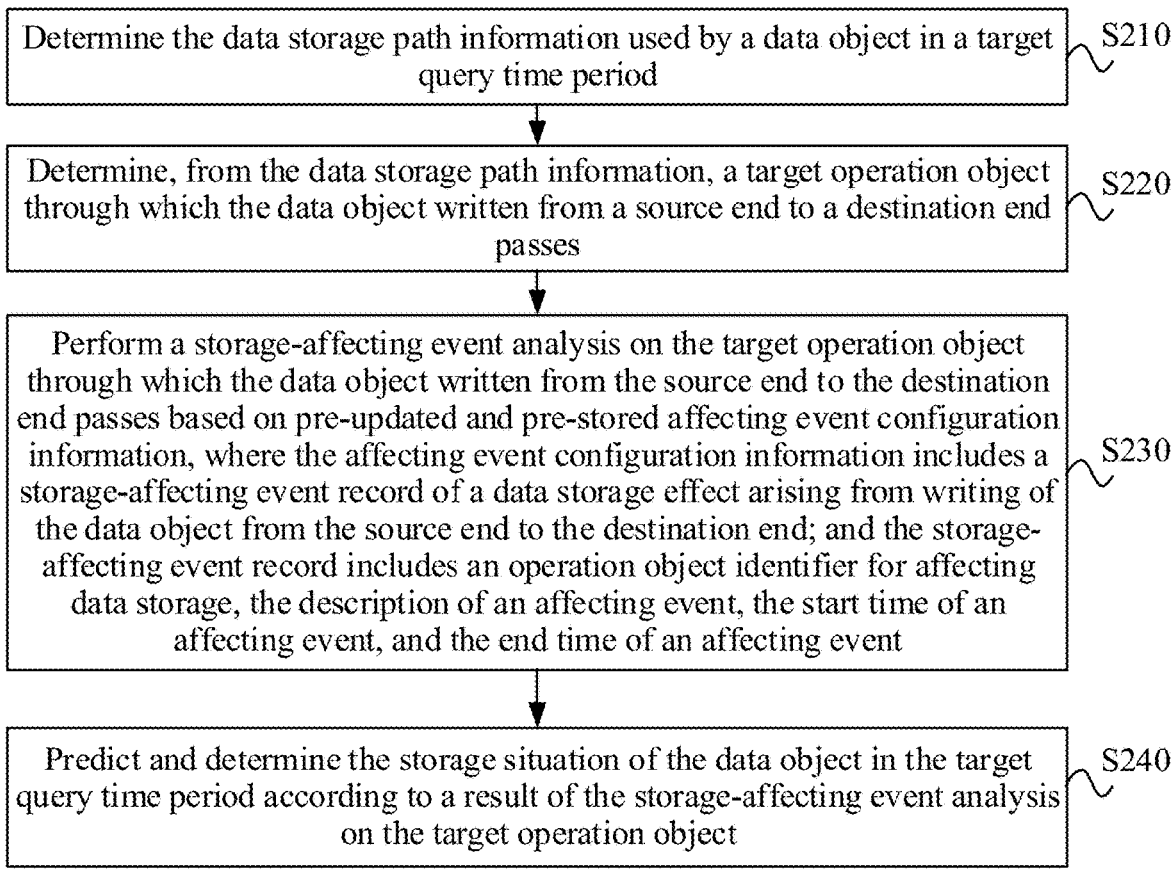
FIG. 2 is a flowchart of another data retrieval prediction method according to some embodiments of the present disclosure.

FIG. 2 is a flowchart of another data retrieval prediction method according to some embodiments of the present disclosure. This embodiment of the present disclosure is refined on the basis of each preceding embodiment and may be combined with each solution in the preceding at least one embodiment. As shown in FIG. 2, the data retrieval prediction method provided in this embodiment of the present disclosure may include the steps below.

In S210, the data storage path information used by a data object in a target query time period is determined.

In S220, a target operation object through which the data object written from a source end to a destination end passes is determined from the data storage path information.

In S230, a storage-affecting event analysis is performed on the target operation object through which the data object written from the source end to the destination end passes based on pre-updated and pre-stored affecting event configuration information.

The affecting event configuration information includes a storage-affecting event record of a data storage effect arising from writing of the data object from the source end to the destination end. The storage-affecting event record includes an operation object identifier for affecting data storage, the description of an affecting event, the start time of an affecting event, and the end time of an affecting event.

For all nodes, units, modules and operations in a security system, a set of all pieces of information that may affect the data storage is predefined and marked as the affecting event configuration information. As shown in Table 4, in the process of writing the data object from the source end to the destination end, one storage-affecting event record is generated for each operation object that may affect the storage of the data object. The generated storage-affecting event record is added to the affecting event configuration information. A record field in each storage-affecting event record may include an event number of a storage-affecting event, an operation object identifier for affecting the data storage, the description of the affecting event, the start time of the affecting event, and the end time of the affecting event.

TABLE 4

Affecting event configuration information table

| Event number | Object identifier | Event description | Start time | End time |
|---|---|---|---|---|
| 00000001 | IPC_098 | 002/Network outage | 2021 Apr. 26 17:00 | 2021 Apr. 26 17:20 |
| 00000002 | Server_2500 | 001/Power outage | 2021 Apr. 26 20:25 | 2021 Apr. 26 20:55 |
| 00000003 | Disk_005_020 | 10001/Offline | 2021 Apr. 26 20:25 | 2021 Apr. 26 20:55 |
| 00000004 | IPC_2021 | Storage stop log | 2021 Apr. 26 22:25 | 2021 Apr. 26 22:55 |
| 00000005 | User operation_005 | User 1 stops a data storage plan of camera IPC_005 | 2021 Apr. 26 22:25 | 2021 Apr. 26 23:00 |
| ... | ... | ... | ... | ... |

After the pre-stored affecting event configuration information is acquired, multiple storage-affecting event records recorded in the affecting event configuration information may be queried. It is determined by querying the multiple storage-affecting event records whether the target operation object experienced in the writing from the source end to the destination end is recorded in the affecting event configuration information, implementing the storage-affecting event analysis on the target operation object experienced in the writing from the source end to the destination end. In an embodiment, situations of the multiple operation objects affecting the data storage in the security system may be captured in real time through data capture technology. Moreover, the affecting event configuration information is updated in real time based on a capture result. For example, data capture may be performed on a log record.

In a solution of this embodiment, the step in which the storage-affecting event analysis is performed on the target operation object through which the data object written from the source end to the destination end passes based on the pre-stored affecting event configuration information includes steps A1 to A2.

In step A1, if it is queried that the target operation object exists in the affecting event configuration information, a start and end time period of an affecting event of the target operation object recorded in the storage-affecting event record of the affecting event configuration information is determined.

In step A2, if an overlapping time period exists between the start and end time period of the affecting event of the target operation object and the target query time period, the abnormal storage of the data object existing in the overlapping time period is predicted.

For the security system, each front-end collection device is in normal collection and storage. When a user or an intelligent system performs data retrieval according to the query time required by a query, all target operation objects through which the data object written from the source end to the destination end in the target query time period passes are queried. Further, the affecting event configuration information is traversed or queried in a direction to determine whether the affecting event configuration information includes the storage-affecting event record corresponding to the target operation object. If the storage-affecting event record corresponding to the target operation object is included, the start and end time period of the affecting event of the target operation object recorded in the storage-affecting event record of the affecting event configuration information is queried. If the storage-affecting event record corresponding to the target operation object is not included, it is considered that the target operation object does not have a storage effect. Correspondingly, no abnormal storage of the data object exists in the target query time period.

For a start and end time period of an affecting event of each target operation object, a start and end time period of an affecting event of a target operation object is compared with the target query time period to judge whether an overlapping time period exists between two time periods. If an overlapping time period exists between the start and end time period of the affecting event of the target operation object and the target query time period, the abnormal storage of the data object existing in the overlapping time period is predicted, indicating that a condition for affecting the data storage has occurred in the overlapping time period. Then the abnormal storage of the data object in the overlapping time period in the target query time period is determined, determining that the data object is not stored in the overlapping time period. If no overlapping time period exists between the start and end time period of the affecting event of the target operation object and the target query time period, no abnormal storage of the data object in the target query time period is determined, determining that the data object is stored in the target query time period.

In another solution of this embodiment, the step in which the storage-affecting event analysis is performed on the target operation object through which the data object written from the source end to the destination end passes based on the pre-stored affecting event configuration information includes steps B1 to B2.

In step B1, if a start and end time period of an affecting event that matches the target query time period and is recorded in the affecting event configuration information is queried, then an operation object, which corresponds to the overlapping time period existing between the start and end time period of the affecting event and the target query time period, is queried from the storage-affecting event record in the affecting event configuration information.

In step B2, if an overlapping object exists between the target operation object and the operation object corresponding to the overlapping time period existing between the start and end time period of the affecting event and the target query time period, then the abnormal storage of the data object is predicted to exist in the overlapping time period.

With the adoption of the preceding solutions, a data storage situation is predicted by using storage-effecting events corresponding to predefined affecting factors of various nodes, hierarchies and modules of the system in combination with predefined storage-effecting events undergone by multiple target operation objects in the entire path of the data object from the storage source end to the destination end so that a data retrieval prediction result tends to be accurate, dispersing the service pressure caused by the high concurrent data retrieval of the system and confirming the data storage situation more intuitively.

In S240, the storage situation of the data object in the target query time period is predicted and determined according to a result of the storage-affecting event analysis on the target operation object.

Referring to Table 4, the result of the storage-affecting event analysis on the target operation object may include that the target operation object undergoes a storage-affecting event in part of the overlapping time period between the start and end time period of the affecting event and the target query time period, causing the abnormal storage of the data object in at least part of the target query time period. Alternatively, the target operation object has no start and end time period of an affecting event, or no overlapping time period exists between the start and end time period of the affecting event of the target operation object and the target query time period; in this case, no abnormal storage of the data object exists in the target query time period.

In a solution of this embodiment, the data retrieval prediction method provided in this embodiment of the present disclosure may further include the step below.

The storage-affecting event record of the operation object affecting the data storage in the affecting event configuration information is updated and corrected through a bypass device associated with the operation object affecting the data storage.

In an embodiment, the bypass device and the operation object affecting the data storage satisfy the following condition: the bypass device and the operation object affecting the data storage are not in the same data storage path and do not act as bypass roles to each other.

When a retrieval prediction is performed on storage of the data object, a prediction mechanism has a small probability of uncertainty. Therefore, a bypass role confirmation mechanism is introduced to confirm once whether a result is correct or not, forming a two-way identification. A bypass role is defined as a subject that is not in the storage flow, does not participate in the storage process, but is directly associated with a subject of the storage, that is, associated with an operation object. For example, one data storage path is IPC—switch 1—switch 2—server 1—storage device 1. In this case, a bypass role of the operation object switch 2 may be server 5 connected to switch 2. Server 5 may confirm whether switch 2 operates properly, for example, whether switch 2 communicates properly.

A bypass device and a bypass event are predefined for each operation object in a preset data storage path. In an embodiment, operation objects in the same data storage path do not act as bypass roles to each other. Alternatively, the bypass device and the operation object affecting the data storage are not in the same data storage path and do not act as bypass roles to each other (referring to the example in the preceding paragraph, after server 5 is taken as the bypass role of the operation object switch 2 connected to server 5, switch 2 cannot be taken as a bypass role of server 5), thereby increasing credibility. The storage-affecting event record of the operation object in an abnormal storage situation in the affecting event configuration information is updated and corrected through the bypass device associated with the operation object affecting the data storage. For example, as shown in Table 5, in the updating and correction, an operation object number, a bypass role number, and a confirmation information number of the bypass role for an operation object are recorded.

TABLE 5

Bypass event configuration information

| Object identifier | Bypass device identifier | Confirmation information number |
|---|---|---|
| IPC_001 | Switch_010 | A port sends a stream |
| IPC_... | ... | ... |
| IPC_XXX | ... | ... |
| Switch | Server_099 | Normal communication |
| Switch_... | ... | ... |
| Switch | ... | ... |
| Server | ... | ... |
| ... | ... | ... |

The bypass mechanism is used to correct a result of the affecting event configuration information. If a result of determining, by the bypass role, the operation object of the storage-affecting event record coincides with a result recorded in the affecting event configuration information between the start time of the affecting event and the end time of the affecting event in the storage-affecting event record, it is considered that no video storage is performed in this time period. If the recorded result is contrary to the obtained determination result, one real data query is started, and the query result is taken as a final result. For example, a storage-affecting event record indicates that some server is disconnected. Moreover, a bypass role of the server records that the server loses communication in the same time period. In this case, it is considered that results coincide with each other. Then no image data storage is considered in this time period. On the contrary, when results do not coincide with each other, one image data query in this time period is started for result confirmation.

In an embodiment, the step in which the storage-affecting event record of the target operation object affecting the data storage in the affecting event configuration information is updated and corrected through the bypass device associated with the target operation object affecting the data storage includes the steps below.

In response to that a result of determining, by the bypass device, the target operation object corresponding to the storage-affecting event record coincides with a result recorded in the affecting event configuration information between the start time of the affecting event and the end time of the affecting event in the storage-affecting event record, it is indicated that no video storage is performed between the start time of the affecting event and the end time of the affecting event, and the storage-affecting event record in the affecting event configuration information does not need to be updated and corrected. In response to that the result of determining, by the bypass device, the target operation object corresponding to the storage-affecting event record is contrary to the result recorded in the affecting event configuration information, one real data query is started, the query result is taken as a final result, and it is determined according to the final result whether to update and correct the storage-affecting event record in the affecting event configuration information.

In an embodiment, in the affecting event configuration information, storage-affecting event records generated by manual start-stop storage and alarm linkage start-stop storage have no bypass role. The credibility of the storage-affecting event records does not need to be authenticated by a bypass role. The information queried in the storage-affecting event records may be directly judged to be credible.

With the adoption of the preceding solutions, the bypass role confirmation mechanism and a mechanism of constantly replenishing affecting events are used. The bypass role is used to confirm whether the storage-affecting event record recorded in the affecting event configuration information is correct or not. The storage-affecting event record in the affecting event configuration information is learnt and updated constantly. Accordingly, the prediction tends to be accurate.

In a solution of this embodiment, the data retrieval prediction method provided in this embodiment of the present disclosure may further include the step below.

In a non-high concurrent time period of the data retrieval prediction, a new operation object causing a data storage effect is determined through a data retrieval sampling inspection, and a new storage-affecting event record is formed and added to the affecting event configuration information.

A video retrieval sampling inspection is performed in a time period in which the data storage is believed to exist. A sampling inspection algorithm may meet the requirements of not increasing system pressure and can cover all IPCs within a period of time. For example, a time period when the system is relatively idle is selected. Data query is performed in batches for data in important time periods of a camera (for example, important time periods monitored by a school is a time period of entering the school and a time period of leaving the school). If no video time period is found in the sampling inspection, a reason (which can be recorded after manual positioning) needs to be discovered. Moreover, the found storage-affecting event record formed by a new data storage effect is added to the affecting event configuration information so as to accumulate more pieces of affecting event configuration information and improve the accuracy of subsequent retrieval and predictions. In an initial stage, for cameras in the same area, preset data storage paths are as different as possible in configuration, reducing the effect of a failure in a single area.

According to the data retrieval prediction method provided in this embodiment of the present disclosure, the target operation object through which the data object written from the source end to the destination end in the target query time period passes is determined. The storage situation of the data object in the target query time period is predicted by analyzing whether the target operation object undergoes a storage effect. Instead of retrieving the stored data object directly, the data storage situation is predicted by using an operation object through which the data object written from the source end to the destination end passes to perform the storage-affecting event analysis, dispersing and resolving the system service pressure caused by a large amount of concurrent data retrieval. Additionally, the data storage situation is predicted by using the affecting event configuration information of various nodes, hierarchies and modules of the system in combination with data storage situations undergone by multiple operation objects in the entire storage path from the storage source end to the destination end. Moreover, the bypass role confirmation mechanism is used, and the affecting event configuration information is learnt and updated constantly. Accordingly, the prediction tends to be accurate.

Figure 3:
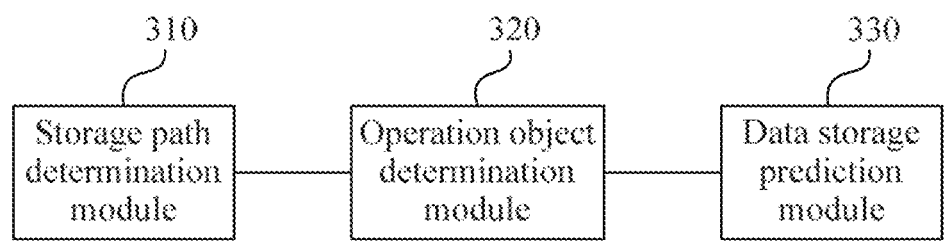
FIG. 3 is a block diagram of a data retrieval prediction apparatus according to some embodiments of the present disclosure.

FIG. 3 is a block diagram of a data retrieval prediction apparatus according to some embodiments of the present disclosure. Technical solutions in this embodiment may be applied to the case of querying a data storage situation in a storage device due to data requirements. The apparatus may be implemented by software and/or hardware and integrated on any electronic device having a network communication function. As shown in FIG. 3, the data retrieval prediction apparatus in this embodiment of the present disclosure may include a storage path determination module 310, an operation object determination module 320, and a data storage prediction module 330.

The storage path determination module 310 is configured to determine the data storage path information used by a data object in a target query time period.

The operation object determination module 320 is configured to determine, from the data storage path information, a target operation object through which the data object written from a source end to a destination end passes.

The data storage prediction module 330 is configured to predict and determine a storage situation of the data object in the target query time period by performing a storage-affecting event analysis on the target operation object.

In an embodiment, the data storage prediction module 330 predicts and determines the storage situation of the data object in the target query time period by performing the storage-affecting event analysis on the target operation object through the manner below.

The storage-affecting event analysis on the target operation object through which the data object written from the source end to the destination end passes is performed based on pre-stored affecting event configuration information.

The storage situation of the data object in the target query time period is predicted and determined according to a result of the storage-affecting event analysis on the target operation object.

The affecting event configuration information includes a storage-affecting event record of a data storage effect arising from writing of the data object from the source end to the destination end. The storage-affecting event record includes an operation object identifier for affecting data storage, the description of an affecting event, the start time of the affecting event, and the end time of the affecting event.

In an embodiment, the step in which the storage-affecting event analysis on the target operation object through which the data object written from the source end to the destination end passes is performed based on the pre-stored affecting event configuration information includes the steps below.

If it is queried that the target operation object exists in the affecting event configuration information, a start and end time period of an affecting event of the target operation object recorded in the storage-affecting event record of the affecting event configuration information is determined.

If an overlapping time period exists between the start and end time period of the affecting event of the target operation object and the target query time period, the abnormal storage of the data object existing in the overlapping time period is predicted.

In an embodiment, operation objects through which the data object written from the source end to the destination end passes may include at least two of a front-end collection device, a server, a switch device, a storage end device, a storage end device grouping, a disk, an array, a user start-stop storage operation, or an alarm linkage start-stop storage operation.

In an embodiment, the storage-affecting event includes at least one of a network outage, a power outage, a device offline restart, a service offline restart, or a user operation.

In an embodiment, the apparatus further includes an affecting event configuration information correction module.

The affecting event configuration information correction module is configured to update and correct, through a bypass device associated with an operation object affecting the data storage, a storage-affecting event record of the operation object affecting the data storage in the affecting event configuration information.

The bypass device and the operation object affecting the data storage are not in the same data storage path and do not act as bypass roles to each other.

In an embodiment, the apparatus further includes a data retrieval sampling inspection module.

The data retrieval sampling inspection module is configured to, in a non-high concurrent time period of data retrieval predictions, determine, through a data retrieval sampling inspection, a new operation object causing a data storage effect, form a new storage-affecting event record, and add the new storage-affecting event record to the affecting event configuration information.

In an embodiment, the affecting event configuration information correction module updates and corrects, through the bypass device associated with the operation object affecting the data storage, the storage-affecting event record of the operation object affecting the data storage in the affecting event configuration information through the manner below.

In response to that a determination result of the bypass device on the operation object corresponding to the storage-affecting event record coincides with a result recorded in the affecting event configuration information between the start time of the affecting event and the end time of the affecting event in the storage-affecting event record, it is indicated that no video storage is performed between the start time of the affecting event and the end time of the affecting event, and the storage-affecting event record in the affecting event configuration information does not need to be updated and corrected. In response to that the determination result of the bypass device on the operation object corresponding to the storage-affecting event record is contrary to the result recorded in the affecting event configuration information, one real data query is started, the query result is taken as a final result, and it is determined according to the final result whether to update and correct the storage-affecting event record in the affecting event configuration information.

The data retrieval prediction apparatus provided in embodiments of the present disclosure may perform the data retrieval prediction method in any preceding embodiment of the present disclosure and has corresponding functions for performing the data retrieval prediction method. For the technical details not described in detail in the preceding embodiments, reference may be made to the data retrieval prediction method provided in any embodiment of the present disclosure.

Figure 4:
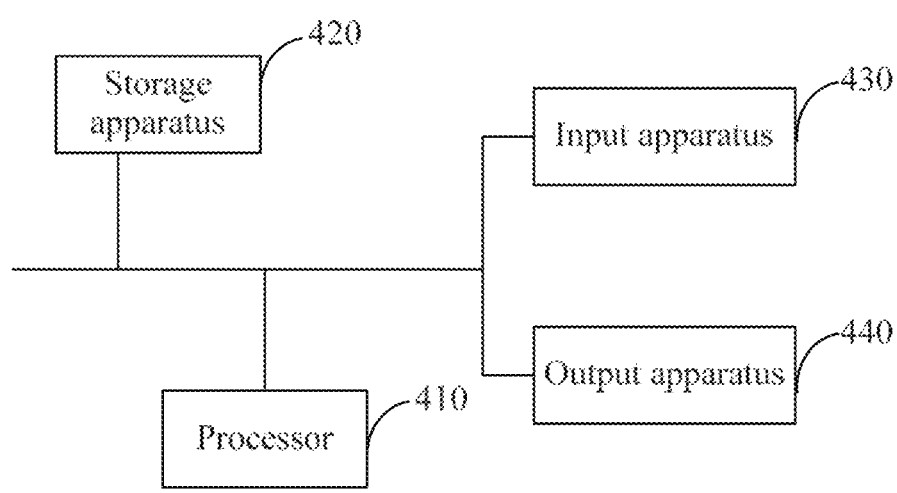
FIG. 4 is a structural diagram of an electronic device according to some embodiments of the present disclosure.

FIG. 4 is a structural diagram of an electronic device according to some embodiments of the present disclosure. As shown in FIG. 4, the electronic device provided in this embodiment of the present disclosure includes at least one processor 410 and a storage apparatus 420. At least one processor 410 may be provided in the electronic device. One processor 410 is shown as an example in FIG. 4. The storage apparatus 420 is configured to store at least one program. When executed by the at least one processor 410, the at least one program causes the at least one processor 410 to perform the data retrieval prediction method in any embodiment of the present disclosure.

The electronic device further includes an input apparatus 430 and an output apparatus 440.

The processor 410, the storage apparatus 420, the input apparatus 430 and the output apparatus 640 in the electronic device may be connected via a bus or in other manners. The connection via a bus is shown as an example in FIG. 4.

As a computer-readable storage medium, the storage apparatus 420 in the electronic device may be configured to store at least one program. A program may be a software program, a computer-executable program, and a module, such as a program instruction/module corresponding to the data retrieval prediction method provided in embodiments of the present disclosure. The processor 410 runs the software program, instruction and module stored in the storage apparatus 420 to execute various function applications and data processing of the electronic device, that is, to perform the data retrieval prediction method in the preceding method embodiments.

The storage apparatus 420 may include a program storage area and a data storage area. The program storage area may store an operating system and an application program required by at least one function. The data storage area may store the data created according to the use of the electronic device. Additionally, the storage apparatus 420 may include a high-speed random-access memory and may also include a non-volatile memory, such as at least one magnetic disk memory, a flash memory or another non-volatile solid-state memory. In some examples, the storage apparatus 420 may further include memories located remotely relative to the processor 410, and these remote memories may be connected to the device via a network. Examples of the preceding network include, but are not limited to, the Internet, an intranet, a local area network, a mobile communication network, and a combination thereof.

The input apparatus 430 may be configured to receive input digital or character information and generate key signal input related to user settings and function control of the electronic device. The output apparatus 440 may include a display device, for example, a display screen.

Moreover, when executed by the at least one processor 410, the at least one program included in the preceding electronic device performs the operations below.

The data storage path information used by a data object in a target query time period is determined.

A target operation object through which the data object written from a source end to a destination end passes is determined from the data storage path information.

A storage situation of the data object in the target query time period is predicted and determined by performing a storage-affecting event analysis on the target operation object.

Of course, those skilled in the art may understand that when the at least one program included in the electronic device is executed by the at least one processor 410, the at least one program may perform a relevant operation in the data retrieval prediction method provided in any embodiment of the present disclosure.

An embodiment of the present disclosure provides a computer-readable storage medium for storing a computer program. When the computer program is executed by a processor, the data retrieval prediction method is performed. The method includes the steps below.

The data storage path information used by a data object in a target query time period is determined.

A target operation object through which the data object written from a source end to a destination end passes is determined from the data storage path information.

A storage situation of the data object in the target query time period is predicted and determined by performing a storage-affecting event analysis on the target operation object.

In an embodiment, when executed by the processor, the program may also be used for performing the data retrieval prediction method provided in any embodiment of the present disclosure.

The computer storage medium in the embodiments of the present disclosure may use any combination of at least one computer-readable medium. The computer-readable medium may be a computer-readable signal medium or a computer-readable storage medium. For example, the computer-readable storage medium may be, but is not limited to, an electrical, magnetic, optical, electromagnetic, infrared or semiconductor system, apparatus or device or any combination thereof. Examples (a non-exhaustive list) of the computer-readable storage medium include an electrical connection having at least one wire, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device or any suitable combination thereof. The computer-readable storage medium may be any tangible medium including or storing a program. The program may be used by or used in conjunction with an instruction execution system, apparatus or device.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal or any suitable combination thereof. The computer-readable signal medium may be any computer-readable medium other than the computer-readable storage medium. The computer-readable medium may send, propagate, or transmit a program used by or used in conjunction with an instruction execution system, apparatus, or device.

Program codes included in computer-readable media may be transmitted by using any suitable medium, including, but not limited to, a wireless medium, a wired medium, an optical cable, a radio frequency (RF) and the like or any suitable combination thereof.

Computer program codes for performing the operations of the present disclosure may be written in one or more programming languages or a combination thereof, the programming languages including object-oriented programming languages such as Java, Smalltalk, C++ and further including conventional procedural programming languages such as C programming language or similar programming languages. The program codes may be executed entirely on a user computer, executed partly on a user computer, executed as a stand-alone software package, executed partly on a user computer and partly on a remote computer, or executed entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

In the description of the specification, the description of reference terms "an embodiment", "some embodiments", "example", "specific example", or "some examples" and the like means a specific characteristic, a structure, a material or a characteristic described in connection with the embodiment or the example are included in at least one embodiment or example of the present disclosure. In the specification, the illustrative description of the preceding terms does not necessarily refer to the same embodiment or example. Moreover, the described specific features, structures, materials or characteristics may be combined in an appropriate manner in any one or more embodiments or examples.

What is claimed is:

1. A data retrieval prediction method performed by a data retrieval prediction apparatus applied in a security system, comprising:
    determining data storage path information used by a data object in a target query time period;
    determining, from the data storage path information, a target operation object through which the data object written from a source end to a destination end passes, wherein the target operation object through which the data object written from the source end to the destination end passes comprises at least two of a front-end collection device, a server, a switch device, a storage end device, a storage end device grouping, a disk, an array, a user start-stop storage operation, or an alarm linkage start-stop storage operation; and
    predicting and determining a storage situation of the data object in the target query time period by performing a storage-affecting event analysis on the target operation object;
    wherein predicting and determining the storage situation of the data object in the target query time period by performing the storage-affecting event analysis on the target operation object comprises:
    performing, based on pre-stored affecting event configuration information, the storage-affecting event analysis on the target operation object through which the data object written from the source end to the destination end passes; and
    predicting and determining the storage situation of the data object in the target query time period according to a result of the storage-affecting event analysis on the target operation object,
    wherein the affecting event configuration information comprises a storage-affecting event record of a data storage effect arising from writing of the data object from the source end to the destination end; and the storage-affecting event record comprises an operation object identifier for affecting data storage, description of an affecting event, start time of an affecting event, and end time of an affecting event;
    wherein the data retrieval prediction method further comprises:
    updating and correcting, through a bypass device associated with a target operation object affecting data storage, a storage-affecting event record of the target operation object affecting data storage in the affecting event configuration information;
    wherein the bypass device and the target operation object affecting data storage satisfy a following condition: the bypass device and the target operation object affecting data storage are not in a same data storage path and do not act as bypass roles to each other; and
    wherein updating and correcting, through the bypass device associated with the target operation object affecting data storage, the storage-affecting event record of the target operation object affecting data storage in the affecting event configuration information comprises:
    in response to that a determination result of the bypass device on the target operation object corresponding to the storage-affecting event record coincides with a result recorded in the affecting event configuration information between the start time of the affecting event and the end time of the affecting event in the storage-affecting event record, indicating that no video storage is performed between the start time of the affecting event and the end time of the affecting event and not needing to update and correct the storage-affecting event record in the affecting event configuration information; and
    in response to that the determination result of the bypass device on the target operation object corresponding to the storage-affecting event record is contrary to the result recorded in the affecting event configuration information, starting one real data query, taking a query result as a final result, and determining, according to the final result, whether to update and correct the storage-affecting event record in the affecting event configuration information.

2. The data retrieval prediction method of claim 1, wherein performing, based on the pre-stored affecting event configuration information, the storage-affecting event analysis on the target operation object through which the data object written from the source end to the destination end passes comprises:
    in response to querying that the target operation object exists in the affecting event configuration information, determining a start and end time period of an affecting event of the target operation object recorded in the storage-affecting event record of the affecting event configuration information; and
    in response to an overlapping time period existing between the start and end time period of the affecting event of the target operation object and the target query time period, predicting abnormal storage of the data object existing in the overlapping time period.

3. The data retrieval prediction method of claim 1, wherein a storage-affecting event undergone by the target operation object comprises at least one of a network outage, a power outage, a device offline restart, a service offline restart, or a user operation.

4. The data retrieval prediction method of claim 1, further comprising:
    in a predicted time period in which concurrent data retrievals do not exceed a threshold, determining, through a data retrieval sampling inspection, a new operation object causing a data storage effect, and forming a new storage-affecting event record and adding the new storage-affecting event record to the affecting event configuration information.

5. An electronic device applied in a security system, comprising:
   at least one processor; and
   a storage apparatus configured to store at least one program,
   wherein when executed by the at least one processor, the at least one program causes the at least one processor to perform:
   determining data storage path information used by a data object in a target query time period;
   determining, from the data storage path information, a target operation object through which the data object written from a source end to a destination end passes, wherein the target operation object through which the data object written from the source end to the destination end passes comprises at least two of a front-end collection device, a server, a switch device, a storage end device, a storage end device grouping, a disk, an array, a user start-stop storage operation, or an alarm linkage start-stop storage operation; and
   predicting and determining a storage situation of the data object in the target query time period by performing a storage-affecting event analysis on the target operation object;
   wherein the at least one program causes the at least one processor to implement predicting and determining the storage situation of the data object in the target query time period by performing the storage-affecting event analysis on the target operation object by:
   performing, based on pre-stored affecting event configuration information, the storage-affecting event analysis on the target operation object through which the data object written from the source end to the destination end passes; and
   predicting and determining the storage situation of the data object in the target query time period according to a result of the storage-affecting event analysis on the target operation object,
   wherein the affecting event configuration information comprises a storage-affecting event record of a data storage effect arising from writing of the data object from the source end to the destination end; and the storage-affecting event record comprises an operation object identifier for affecting data storage, description of an affecting event, start time of an affecting event, and end time of an affecting event; and
   wherein when executed by the at least one processor, the at least one program causes the at least one processor to perform:
   updating and correcting, through a bypass device associated with a target operation object affecting data storage, a storage-affecting event record of the target operation object affecting data storage in the affecting event configuration information;
   wherein the bypass device and the target operation object affecting data storage satisfy a following condition: the bypass device and the target operation object affecting data storage are not in a same data storage path and do not act as bypass roles to each other; and
   wherein updating and correcting, through the bypass device associated with the target operation object affecting data storage, the storage-affecting event record of the target operation object affecting data storage in the affecting event configuration information comprises:
   in response to that a determination result of the bypass device on the target operation object corresponding to the storage-affecting event record coincides with a result recorded in the affecting event configuration information between the start time of the affecting event and the end time of the affecting event in the storage-affecting event record, indicating that no video storage is performed between the start time of the affecting event and the end time of the affecting event and not needing to update and correct the storage-affecting event record in the affecting event configuration information; and
   in response to that the determination result of the bypass device on the target operation object corresponding to the storage-affecting event record is contrary to the result recorded in the affecting event configuration information, starting one real data query, taking a query result as a final result, and determining, according to the final result, whether to update and correct the storage-affecting event record in the affecting event configuration information.

6. A non-transitory computer-readable storage medium for storing a computer program applied in a security system, wherein when executed by a processor, the computer program causes the processor to perform:
   determining data storage path information used by a data object in a target query time period;
   determining, from the data storage path information, a target operation object through which the data object written from a source end to a destination end passes, wherein the target operation object through which the data object written from the source end to the destination end passes comprises at least two of a front-end collection device, a server, a switch device, a storage end device, a storage end device grouping, a disk, an array, a user start-stop storage operation, or an alarm linkage start-stop storage operation; and
   predicting and determining a storage situation of the data object in the target query time period by performing a storage-affecting event analysis on the target operation object;
   wherein the computer program causes the processor to implement predicting and determining the storage situation of the data object in the target query time period by performing the storage-affecting event analysis on the target operation object by:
   performing, based on pre-stored affecting event configuration information, the storage-affecting event analysis on the target operation object through which the data object written from the source end to the destination end passes; and
   predicting and determining the storage situation of the data object in the target query time period according to a result of the storage-affecting event analysis on the target operation object,
   wherein the affecting event configuration information comprises a storage-affecting event record of a data storage effect arising from writing of the data object from the source end to the destination end; and the storage-affecting event record comprises an operation object identifier for affecting data storage, description of an affecting event, start time of an affecting event, and end time of an affecting event;

wherein when executed by the processor, the computer program causes the processor to perform:

updating and correcting, through a bypass device associated with a target operation object affecting data storage, a storage-affecting event record of the target operation object affecting data storage in the affecting event configuration information;

wherein the bypass device and the target operation object affecting data storage satisfy a following condition: the bypass device and the target operation object affecting data storage are not in a same data storage path and do not act as bypass roles to each other; and wherein the computer program causes the processor to implement updating and correcting, through the bypass device associated with the target operation object affecting data storage, the storage-affecting event record of the target operation object affecting data storage in the affecting event configuration information by:

in response to that a determination result of the bypass device on the target operation object corresponding to the storage-affecting event record coincides with a result recorded in the affecting event configuration information between the start time of the affecting event and the end time of the affecting event in the storage-affecting event record, indicating that no video storage is performed between the start time of the affecting event and the end time of the affecting event and not needing to update and correct the storage-affecting event record in the affecting event configuration information; and in response to that the determination result of the bypass device on the target operation object corresponding to the storage-affecting event record is contrary to the result recorded in the affecting event configuration information, starting one real data query, taking a query result as a final result, and determining, according to the final result, whether to update and correct the storage-affecting event record in the affecting event configuration information.

7. The electronic device of claim 5, wherein the at least one program causes the at least one processor to implement performing, based on the pre-stored affecting event configuration information, the storage-affecting event analysis on the target operation object through which the data object written from the source end to the destination end passes by:

in response to querying that the target operation object exists in the affecting event configuration information, determining a start and end time period of an affecting event of the target operation object recorded in the storage-affecting event record of the affecting event configuration information; and in response to an overlapping time period existing between the start and end time period of the affecting event of the target operation object and the target query time period, predicting abnormal storage of the data object existing in the overlapping time period.

8. The electronic device of claim 5, wherein the at least one program causes the at least one processor to perform:

in a predicted time period in which concurrent data retrievals do not exceed a threshold, determining, through a data retrieval sampling inspection, a new operation object causing a data storage effect, and forming a new storage-affecting event record and adding the new storage-affecting event record to the affecting event configuration information.

9. The non-transitory computer-readable storage medium of claim 6, wherein the computer program causes the processor to implement performing, based on the pre-stored affecting event configuration information, the storage-affecting event analysis on the target operation object through which the data object written from the source end to the destination end passes by:

in response to querying that the target operation object exists in the affecting event configuration information, determining a start and end time period of an affecting event of the target operation object recorded in the storage-affecting event record of the affecting event configuration information; and in response to an overlapping time period existing between the start and end time period of the affecting event of the target operation object and the target query time period, predicting abnormal storage of the data object existing in the overlapping time period.

10. The non-transitory computer-readable storage medium of claim 6, wherein the computer program causes the processor to perform:

in a predicted time period in which concurrent data retrievals do not exceed a threshold, determining, through a data retrieval sampling inspection, a new operation object causing a data storage effect, and forming a new storage-affecting event record and adding the new storage-affecting event record to the affecting event configuration information.

* * * * *